United States Patent [19]

Andrews

[11] Patent Number: 5,002,643

[45] Date of Patent: Mar. 26, 1991

[54] ELECTRODE WITH OUTSIDE FLOW OF ELECTROLYTE FOR ELECTROCHEMICAL MACHINING AND METHOD

[76] Inventor: James D. Andrews, 420 Waddington, Birmingham, Mich. 48009

[21] Appl. No.: 461,195

[22] Filed: Jan. 5, 1990

[51] Int. Cl.[5] .................. B23H 3/04; B23H 7/32; B23H 9/14

[52] U.S. Cl. ................... 204/129.5; 204/129.55; 204/224 M; 204/225; 204/286; 204/290 R

[58] Field of Search ............... 204/129.55, 129.5, 212, 204/224 R, 286, 225, 284, 129.6, 129.7

[56] References Cited

U.S. PATENT DOCUMENTS

| | | |
|---|---|---|
| 507,374 | 10/1893 | Lyte . |
| 894,317 | 7/1908 | De Forest . |
| 2,577,644 | 4/1943 | Barlett . |
| 2,741,594 | 4/1956 | Bowersett .............. 204/224 M X |
| 3,022,232 | 5/1958 | Bailey et al. . |
| 3,080,310 | 11/1960 | Lindenmaier et al. . |
| 3,257,306 | 8/1959 | Webb . |
| 3,293,166 | 12/1966 | Cowing .............. 204/129.55 X |
| 3,306,838 | 12/1963 | Johnson . |
| 3,325,384 | 6/1967 | Frantzen .............. 204/224 R X |
| 3,418,231 | 11/1965 | Haddad . |
| 3,476,671 | 5/1966 | Petty . |
| 3,533,926 | 10/1970 | Zubak et al. .............. 204/224 M X |
| 3,594,298 | 7/1971 | Abt .............. 204/224 M |
| 3,764,510 | 10/1973 | Bellows .............. 204/284 |
| 3,900,384 | 8/1975 | Gunby . |
| 3,907,659 | 9/1975 | Paige et al. . |
| 3,909,388 | 9/1975 | Faust et al. . |
| 3,990,959 | 11/1976 | Payne et al. .............. 204/224 M X |
| 4,052,284 | 10/1977 | Schrader . |
| 4,194,960 | 3/1980 | Bleikamp, Jr. . |
| 4,504,375 | 3/1985 | Griffioen . |
| 4,543,460 | 9/1985 | Inoue . |
| 4,626,330 | 12/1986 | Farmer . |
| 4,743,731 | 5/1988 | Seuring et al. . |
| 4,801,370 | 1/1989 | Arnesen . |

Primary Examiner—Donald R. Valentine
Attorney, Agent, or Firm—Dykema Gossett

[57] ABSTRACT

An electrochemical machining apparatus is disclosed for removing material from a workpiece. The electrode has a conical tip and an electrolyte is supplied around the outer periphery of the electrode to a gap between the electrode and the workpiece. The combination of the conical tip and the electrolyte being supplied around the outer periphery of the electrode ensures that the gap between the electrode and the workpiece will be maintained at a predetermined distance preventing short-circuiting or uneven drilling of the workpiece.

17 Claims, 1 Drawing Sheet

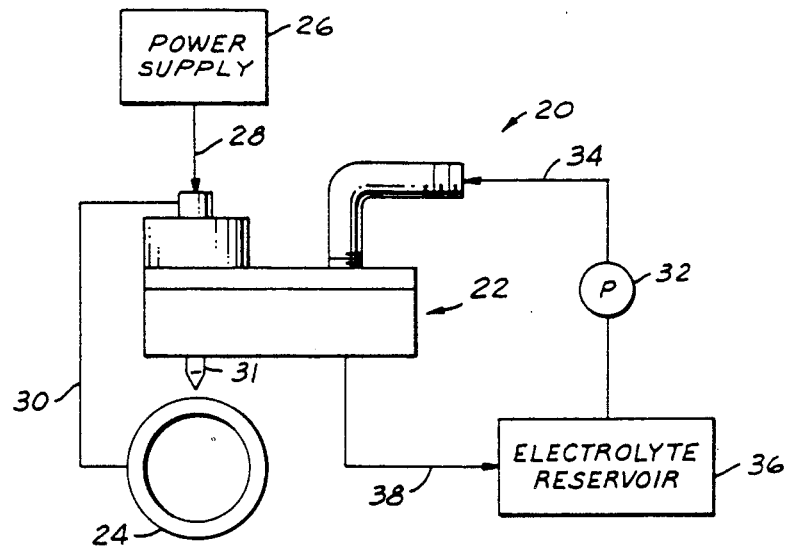
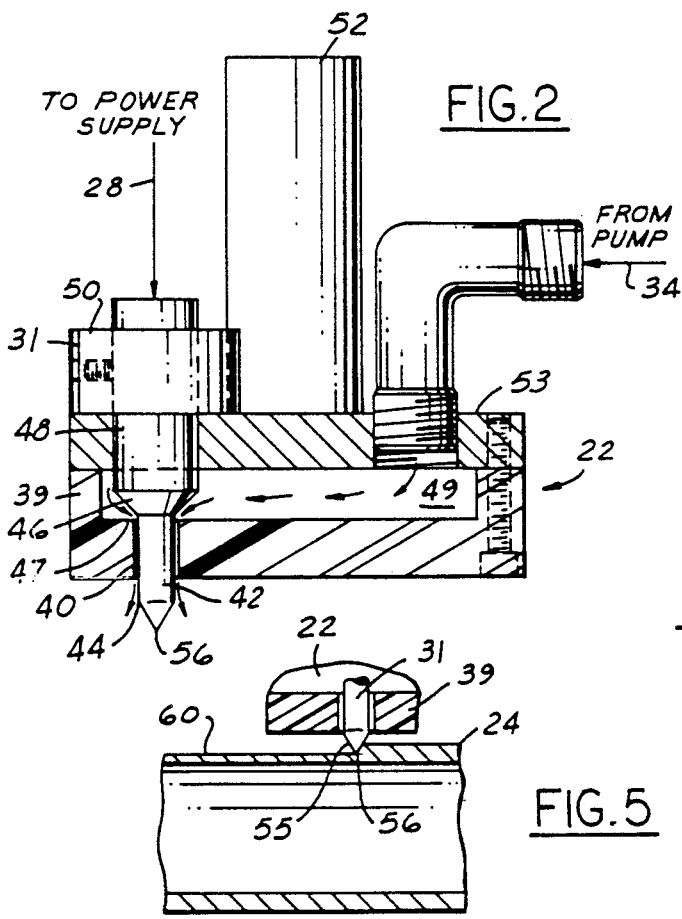
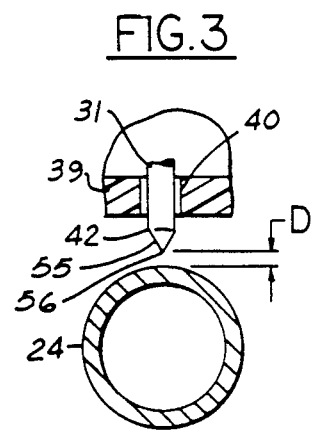
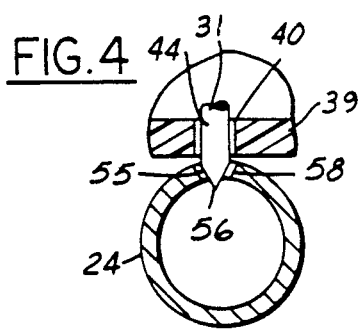

ELECTRODE WITH OUTSIDE FLOW OF ELECTROLYTE FOR ELECTROCHEMICAL MACHINING AND METHOD

BACKGROUND OF THE INVENTION

This invention in general relates to an improved electrode and electrolyte flow path for electrochemical machining.

Electrochemical machining is a known process in which an electrode is placed a predetermined gap distance from a workpiece, and an electrolyte is allowed to flow into the gap between the electrode and the workpiece. Current is passed between the electrode and the workpiece, and an electrochemical process occurs which removes material from the workpiece at positions opposed to the electrode.

In electrochemical machining apparatuses, it is of the utmost importance to ensure that the predetermined gap between the electrode and the workpiece is maintained at all times. If the gap is too small, it is possible to short-circuit the electrode and stop the removal of material from the workpiece. If the gap is too large, electrochemical action will cease, and no metal will be removed.

It is also important to ensure that the electrolyte is uniformly distributed about the electrode throughout the area of the workpiece upon which the electrochemical machining is to be performed. If the concentration of electrolyte is not uniform across the entire area to be machined, it is possible that the areas of greater electrolyte concentration will be more rapidly removed, and thus there may be uneven removal from the workpiece. This in turn can quickly cause the gap between the electrode and the workpiece to vary from the predetermined gap and may short-circuit the apparatus.

The problems with maintaining the gap between the electrode and the workpiece become particularly apparent when the workpiece is a curved or tubular member. Since the outer periphery of the workpiece will be extending along a curved radius in such a member, it is difficult to accurately position an electrode with respect to the workpiece. In the prior art, a hollow cylindrical electrode was utilized and the electrolyte was passed through the center of the electrode. Such an electrode proved undesirable since the face of the electrode extends over too great a surface area, and due to the curvature of the workpiece, it was difficult to accurately maintain a desired gap between such an electrode and the curved or tubular workpiece. If a cylindrical electrode is tilted, there will not be an even gap between the electrode and the workpiece. This is true even for a flat surface workpiece.

In several electrochemical machining applications, the conventional method of supplying electrolyte to the gap between the electrode and the workpiece is inadequate. Electrochemical machining at an oblique angle into a flat surface, or at any angle into a curved surface, are examples of these applications. The electrolyte flows to the place of least resistance, normally the largest gap, and not through the tightest gap, thus creating areas of inadequate electrolyte and allowing an electrode to contact the workpiece which may damage the workpiece or the electrode. These applications are not adequately performed with standard electrochemical machining methods since the electrolyte cannot be controlled, or at best additional external restraints are required to ensure that the electrolyte is properly supplied to the gap between an electrode and a workpiece.

Problems are also encountered with standard electrochemical machining methods at the moment of breakthrough of a drilled hole. Since a drilled hole tends to break through at a center point first, the electrolyte may often escape through the breakthrough hole before the entire drilled hole is machined to its full dimension. When this happens, there is a possibility of the electrode contacting the workpiece, increasing the likelihood of a short circuit.

It is known in electro-discharge machining to supply a dielectric machining fluid to the outer periphery of a cylindrical electrode as a coolant and to remove waste materials from the gap between the electrode and the workpiece. However, electrochemical machining is a very different process than electro-discharge machining and uses a much different fluid.

It is therefore an object of the present invention to disclose an electrode holder and electrode shape to be utilized for electrochemical machining of tubular workpieces in which the electrode has a conical point, and an electrolyte is supplied in adequate amounts at the outer periphery of the electrode to ensure even removal of material from the workpiece. The electrolyte is supplied in adequate amounts, even when the electrochemical machining is performed on workpieces of such shape, or at such angles, as to make proper electrolyte flow difficult by conventional methods.

SUMMARY OF THE INVENTION

The present invention discloses an electrochemical machining apparatus for machining workpieces that may be tubular in which an electrode holder is positioned above a workpiece, and an electrical current is passed between the two. An electrolyte is supplied to the electrode holder from an electrolyte reservoir by a pump. The electrolyte passes into a manifold within the electrode holder and out through a gap between the outer periphery of the electrode and the electrode holder and is uniformly distributed in the working area between the electrode and the workpiece.

The flow of electrolyte to the outer periphery of the electrode travels along the cylindrical upper portion, or passage section, of the electrode and then adheres to the perimeter of the conical tip of the electrode as it moves downwardly into the gap between the electrode and the workpiece. This adherence of the electrolyte to the conical tip keeps the electrode form contacting the workpiece in applications where prior art electrodes may have contacted the workpiece.

By moving the electrode vertically within the electrode holder, the electrode may be positioned to adjust the gap between the electrode and a workpiece. This is particularly important in applications where multiple operations of a similar nature are occurring such as a plurality of holes being drilled by a single electrode holder that may mount a plurality of electrodes. By allowing adjustment of the electrode within the electrode holder, the same gap can be set for the plural electrodes so that the same results can expected from the plurality of electrodes.

By moving the electrode and the electrode holder vertically by some mechanical means, the electrode may be brought downwardly to drill a hole through the outer periphery of the workpiece. By moving the workpiece relative to the electrode, a cut or score line can be formed in the workpiece.

A flared stop portion of the electrode abuts a stop portion within the electrode holder to define a vertically lowermost position of the electrode with respect to the electrode holder. An insulation sheath prevents electrochemical machining by the cylindrical upper portion of the electrode ensuring round drilled holes.

These and other objects and features of the present invention can be best understood from the following specification and drawings, of which the following is a brief description.

BRIEF DESCRIPTION OF THE DRAWINGS

FIG. 1 is a largely schematic view, of the improved electrochemical machining apparatus of the present invention.

FIG. 2 is an enlarged cross-sectional view through an electrode holder as utilized in the improved electrochemical machining apparatus of the present invention.

FIG. 3 is an enlarged cross-sectional view of an electrode and a tubular workpiece in accordance with the present invention.

FIG. 4 is a view similar to FIG. 3 but showing the progression of an electrode into the tubular workpiece.

FIG. 5 is a view similar to FIG. 3 but showing the relative movement of the tubular workpiece and the electrode to form a score line at the outer periphery of the tubular workpiece.

DETAILED DESCRIPTION OF A PREFERRED EMBODIMENT

Electrochemical machining apparatus 20 is illustrated in FIG. 1 and contains electrode holder 22 positioned above a tubular workpiece 24 that is to be scored, cut or drilled. It is to be understood that the workpiece could be a shape other than tubular. Power supply 26 is connected at 28 to electrode 31, at 30 to workpiece 24, and passes a direct electrical current between the two. Pump 32 supplies an electrolyte through line 34 from electrolyte reservoir 36 to electrode holder 22. Optional return line 38 may return unused electrolyte from electrode holder 22 back to electrolyte reservoir 36.

FIG. 2 is a cross-sectional view of electrode holder 22 of the present invention. Electrode 31 is mounted within holder body 39 which has an opening 40 through which a passage section 42 of electrode 31 extends. A sheath of insulation material 44, that may be epoxy resin or the like, is placed along the outer periphery of the passage section 42 and extends downwardly to the beginning of a conical tip 56 which is not coated. Sides 55 extend inwardly to form conical tip 56. The sheath 44 may be shrink-wrapped and prevents electrochemical machining between passage section 42 and workpiece 24. The passage section 42 extends radially outwardly at flared stop 46 which corresponds to stop 47 within holder body 39 and defines a vertically lowermost position for electrode 31. Enlarged portion 48 of electrode 31 extends outwardly of holder body 39 and is connected to power supply 28. Electrode 31 may be moved upwardly or downwardly by any known means to position electrode 31 with respect to tubular workpiece 24.

Electrolyte supply line 34 is connected into holder body 39 and supplies electrolyte to electrolyte manifold 49. Electrolyte can flow from manifold 49 into a gap between passage section 42 of electrode 31 and opening 40. Opening 40 is of a slightly larger diameter than passage section 42, and thus the electrolyte can flow freely between the two.

Adjustable mount 50, that may be of a known type, mounts electrode 31 at predetermined vertical positions. Electrode 31 may be moved through adjustable mount 50 with respect to holder body 39 to adjust the position of electrode 31 with respect to tubular workpiece 24. This is particularly important when plural electrodes are utilized. Electrode holder mount 52, FIG. 2, extends from the top surface 53 of electrode holder 22 and can be mounted to a tool base or the like.

Electrode 31 has a conical tip 56 that results in point contact between electrode 31 and tubular workpiece 24. The electrolyte from manifold 49 passes through opening 40 and is supplied to the work area between electrode 31 and tubular workpiece 24 to ensure uniform distribution of electrolyte. The electrolyte causes a chemical reaction due to the supplied current and removes material from the workpiece.

As shown in FIG. 3, passage section 42 of electrode 31 extends through opening 40 of holder body 39 and is moved towards and away from tubular workpiece 24 to define gap D. A desired gap D is determined by consideration of several variables, including the type of electrolyte utilized, the speed of machining that is desired, the material to be machined, the amount of current supplied to the electrode and tubular workpiece, and several other variables. A typical gap may be on the order of 15/1000 of an inch and thus is difficult to accurately maintain. It is important that gap D is maintained at the predetermined value. Since electrode 31 has a conical tip 56, it is relatively simple to ensure that it is properly oriented relative to the curved surface of tubular workpiece 24.

In the prior art electrochemical apparatus for machining a cylindrical or tubular workpiece, it was necessary to ensure that the electrode was not tilted with respect to the workpiece; otherwise, gap D would vary along the surface face of the electrode. By utilizing a conical tip and roughly creating a point gap between the electrode and the tubular workpiece, the maintenance of a desired gap D is much easier to realize. In addition, supplying electrolyte about the outer periphery of electrode 31 ensures uniform distribution of the electrolyte between electrode 31 and tubular workpiece 24.

The movement of electrode 31 vertically downwardly by some means to drill hole 58 into tubular workpiece 24 is illustrated in FIG. 4. Gap D is maintained between the electrode and the actual surface of tubular workpiece 24. However, as the electrochemical process removes material from the outer periphery of tubular workpiece 24, the electrode 31 is brought vertically downwardly into the area where the material was removed from, although gap D is maintained. Thus, electrode 31 is continuously brought downwardly into tubular workpiece 24, and hole 58 is drilled through tubular workpiece 24.

As hole 58 is beginning to be formed within tubular workpiece 24, a gap is also formed between the sides 55 of conical tip 56 of electrode 31 and the beginnings of hole 58. The supply of the electrolyte to the outer periphery of electrode 31 ensures that there will be an adequate supply of electrolyte through the gap between the sides 55 of conical tip 56 of electrode 31 and tubular workpiece 24.

The flow of electrolyte through opening 40 adheres to conical walls 55 and is thus directed into the gap. When drilling a hole, the electrolyte will not all escape through the breakthrough hole, but will be supplied to the gap in adequate amounts.

FIG. 5 shows the scoring of the outer periphery of tubular workpiece 24 for sawing, milling, cutting, contouring, or forming a score line for some purpose. Some means of moving one of electrode holder 22 or tubular workpiece 24 with respect to the other is required. Electrode 31 is positioned such that gap D is maintained, and the electrochemical process is begun. Tubular workpiece 24 is moved with respect to electrode holder 22 by moving either electrode holder 22 or tubular workpiece 24 by any well-known means of three-dimensional movement. Tubular workpiece 24 is shown having been moved longitudinally along electrode 31 and electrode holder 22, and score line 60 has been formed along its outer periphery.

Electrode 31, as an example, may be formed from tool steel or other electrically conductive material suitable to the electrolyte environment.

Conical tip 56 extends to a point with the conical sides converging to that point at an angle between 45° and 90°. In one embodiment this angle is 90°.

The electrolyte utilized may be any electrolyte commonly used in electrochemical machining.

A preferred embodiment of the present invention has been disclosed; however, it should be understood that a worker skilled in the art would find certain modifications of this invention obvious, and thus the following claims should be reviewed in order to determine the true scope and content of the invention.

What I claim is:

1. An apparatus for electrochemical machining, comprising:
    an electrode holder containing an electrode;
    an electrolyte reservoir for containing an electrochemical machining electrolyte;
    a pump for supplying electrolyte from said electrolyte reservoir to said electrode holder;
    a manifold in said electrode holder whereby the electrolyte is adapted to be directed around the outer periphery of said electrode by said pump to ensure adequate supply and uniform distribution of the electrolyte; and
    said electrode having a passage section of a first diameter and an enlarged section of a second diameter larger than said first diameter, said enlarged section being mounted within said electrode holder, said electrode holder having an opening for passage of said passage section and defining a stop, said opening being of a third diameter smaller than said second diameter such that said opening prevents passage of said enlarged section outwardly of said opening.

2. An apparatus as recited in claim 1, and wherein said electrode has a conical tip.

3. An apparatus as recited in claim 1, and wherein said first diameter is less than said third diameter, thus defining a clearance for passage of the electrochemical machining electrolyte between said electrode and said electrode holder.

4. An apparatus as recited in claim 3, and wherein said passage section has a sheath of insulation material formed at its outer periphery, said conical tip of said electrode being uninsulated.

5. An apparatus as recited in claim 4, and wherein said electrode is vertically movable with respect to said electrode holder.

6. An apparatus as recited in claim 5, and wherein said sheath of insulation is formed from epoxy resin.

7. A method of electrochemical machining a tubular workpiece, comprising the steps of:
    (a) mounting the tubular workpiece;
    (b) positioning an electrode having a conical tip at a position spaced from the tubular workpiece by a set gap;
    (c) supplying an electrolyte about the outer periphery of the electrode; and
    (d) passing a current between the electrode and the tubular workpiece and providing relative movement between the tubular workpiece and the electrode to remove selected portions of the tubular workpiece, wherein the relative movement in step (d) includes vertically lowering the electrode into the tubular member to form a hole therethrough.

8. A method of electrochemical machining a tubular workpiece, comprising the steps of:
    (a) mounting the tubular workpiece;
    (b) positioning an electrode having a conical tip at a position spaced from the tubular workpiece by a set gap;
    (c) supplying an electrolyte about the outer periphery of the electrode;
    (d) passing a current between the electrode and the tubular workpiece and providing relative movement between the tubular workpiece and the electrode to remove selected portions of the tubular workpiece, wherein the relative movement in step (d) includes longitudinally moving the tubular workpiece with respect to the electrode such that a score line is formed at the outer periphery of the tubular workpiece.

9. An apparatus for electrochemical machining a tubular workpiece, comprising:
    a power supply;
    an electrode holder containing an electrode;
    said power supply being connected to said electrode and to the tubular workpiece for passing a current therebetween;
    an electrolyte reservoir for containing an electrochemical machining electrolyte;
    a pump for supplying electrolyte from said electrolyte reservoir to said electrode holder;
    a manifold in said electrode holder whereby the electrolyte is adapted to be directed around the outer periphery of said electrode by said pump to ensure adequate supply and uniform distribution of the electrolyte to a gap located between said electrode and the tubular workpiece; and
    said electrode having a passage section of a first diameter and an enlarged section of a second diameter larger than said first diameter, said enlarged section being mounted within said electrode holder, said electrode holder having an opening for passage of said passage section and defining a stop, said opening being of a third diameter smaller than said second diameter such that said opening prevents passage of said enlarged section outwardly of said opening.

10. An apparatus as recited in claim 9, and wherein said electrode has a conical tip, said gap being defined between the point of said tip and the tubular workpiece.

11. An apparatus as recited in claim 9, and wherein said first diameter is less than said third diameter, thus defining a clearance for passage of the electrochemical machining electrolyte between said electrode and said electrode holder to the gap.

12. An apparatus as recited in claim 11, and wherein said passage section has a sheath of insulation material formed at its outer periphery, said conical tip of said electrode being uninsulated.

13. An apparatus as recited in claim 12, and wherein said electrode is vertically movable with respect to said electrode holder.

14. An apparatus as recited in claim 11, and wherein said third diameter is equal to a desired diameter of a final hole to be drilled in the workpiece.

15. An apparatus for electrochemical machining a tubular workpiece, comprising:
   a power supply;
   an electrode holder containing an electrode;
   said power supply being connected to said electrode and to the tubular workpiece for passing a current therebetween;
   an electrolyte reservoir for containing an electrochemical machining electrolyte;
   a pump for supplying electrolyte from said electrolyte reservoir to said electrode holder;
   a manifold in said electrode holder whereby the electrolyte is adapted to be directed around the outer periphery of said electrode by said pump to ensure adequate supply and uniform distribution of the electrolyte to a gap located between said electrode and the tubular workpiece; and
   a sheath of insulation disposed about said electrode.

16. An apparatus as recited in claim 15, and wherein said electrode is formed of tool steel.

17. An apparatus as recited in claim 16, and wherein said sheath of insulation is formed from epoxy resin.

* * * * *